United States Patent [19]
Oh

[11] Patent Number: 5,609,309
[45] Date of Patent: Mar. 11, 1997

[54] FLY REEL DRAG DIRECTION CHANGER WITH A RATCHET MECHANISM

[75] Inventor: Chul S. Oh, Seoul, Rep. of Korea

[73] Assignee: Shin A Sports Co., Ltd., Inchon, Rep. of Korea

[21] Appl. No.: 498,297

[22] Filed: Jul. 3, 1995

[30]    Foreign Application Priority Data

Apr. 20, 1995 [KR] Rep. of Korea .................... 95U-8041

[51] Int. Cl.⁶ ................................................ A01K 89/015
[52] U.S. Cl. ........................ 242/282; 242/295; 242/302; 242/317; 188/82.9; 188/83
[58] Field of Search .................................. 242/282, 295, 242/296, 302, 306, 307, 308, 317; 188/82.2, 82.3, 82.34, 82.9, 82.7, 82.74, 83

[56]              References Cited

U.S. PATENT DOCUMENTS

| 2,180,566 | 11/1939 | Thompson | 242/295 |
|---|---|---|---|
| 2,436,921 | 3/1948 | Goldstine et al. | 188/83 |
| 4,832,278 | 5/1989 | Sugeta | 242/282 |
| 5,139,214 | 8/1992 | Sato | 188/82.7 X |
| 5,161,750 | 11/1992 | Hitomi | 242/295 |

FOREIGN PATENT DOCUMENTS 350165  12/1960  Switzerland ........................ 188/82.4

Primary Examiner—Daniel P. Stodola
Assistant Examiner—Emmanuel M. Marcelo
Attorney, Agent, or Firm—Graham & James LLP

[57]                ABSTRACT

A fly reel drag direction changer having a ratchet member of the changer which has a ratchet gear part and a circular silent cam slot formed in the ratchet gear part. A silent cam is elastically received in the silent cam slot such that the cam is selectively rotated along with the ratchet member due to elasticity but simply slides in the silent cam slot when the elasticity is overcome. A stopper has a recess for receiving an arm of the silent cam such that the stopper is rotated between a ratchet engaging position and a ratchet releasing position in accordance with the rotating direction of the ratchet member. The stopper is mounted to a rotatable coupling wheel such that the stopper is rotated between the ratchet engaging position and the ratchet releasing position and the rotatable coupling wheel is selectively rotated along with the ratchet member in the ratchet engaging position of the stopper.

3 Claims, 4 Drawing Sheets

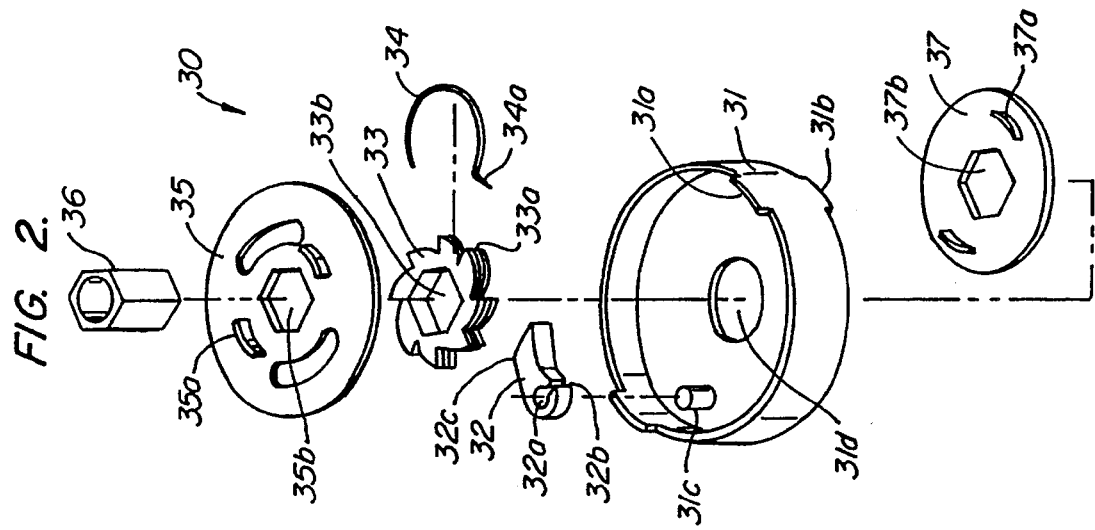
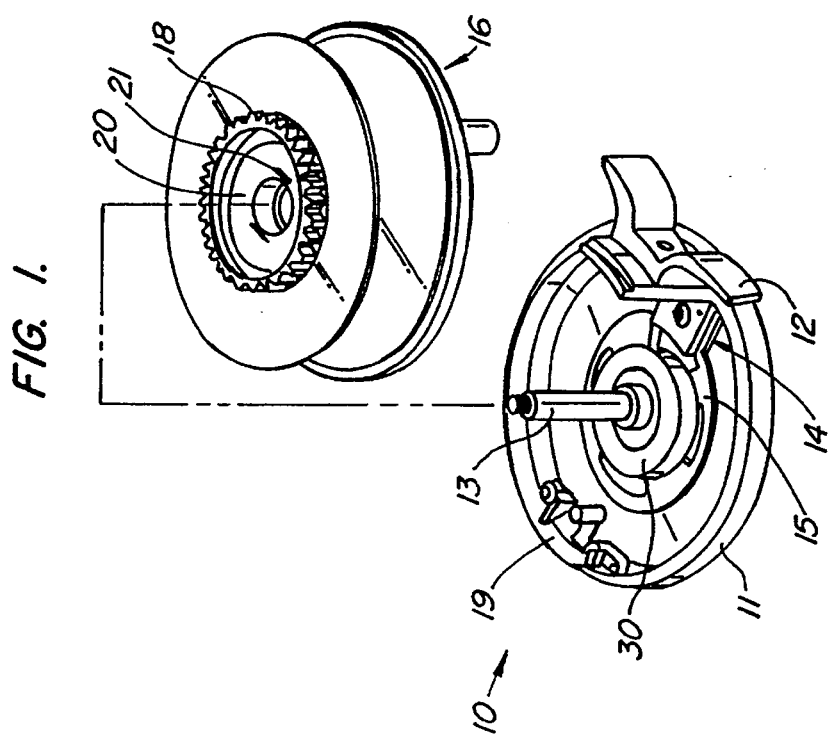

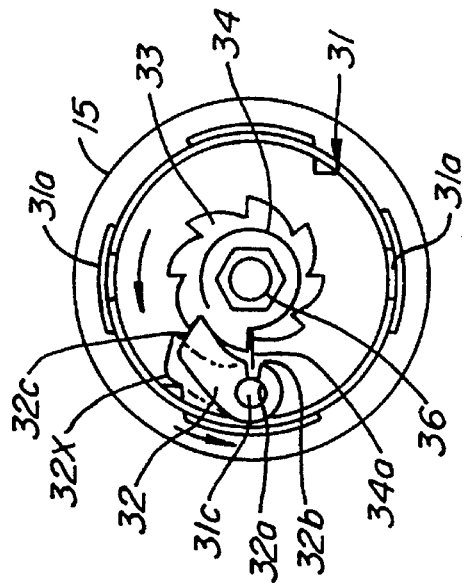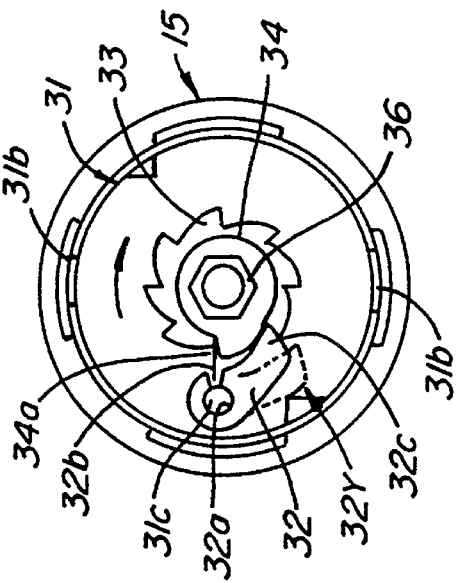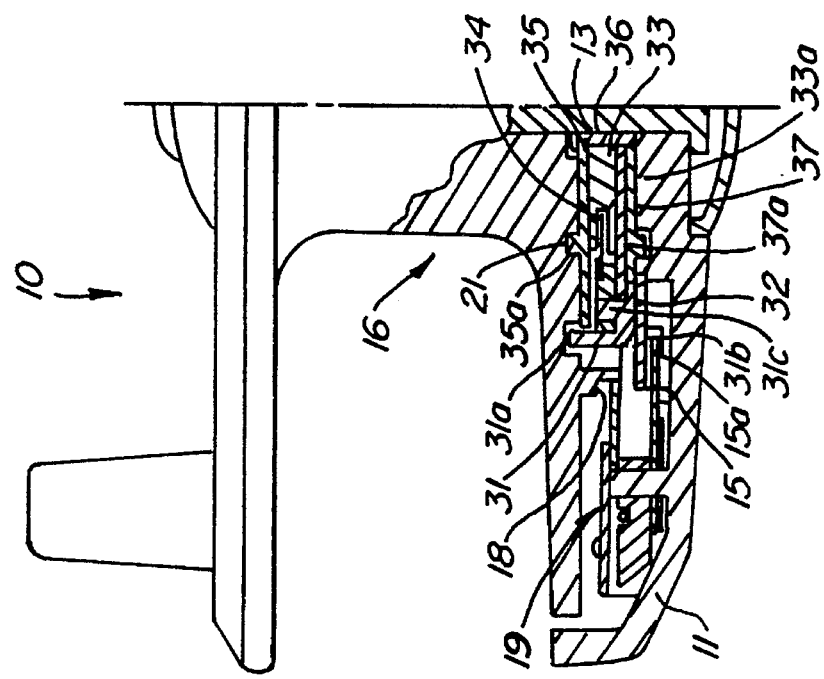

FLY REEL DRAG DIRECTION CHANGER WITH A RATCHET MECHANISM

BACKGROUND OF THE INVENTION

1. Field of the Invention

The present invention relates in general to fly reel drag direction changers and, more particularly, to a structural and functional improvement in such changers for more easily changing the drag direction of the fly reel in accordance with right-handed fishermen and left-handed fishermen and causing no disturbance in spool rotation for retrieving the line and no clicking sound except for the drag sound.

2. Description of the Prior Art

Generally, a typical fly reel is provided with a drag power controller for controlling the spool drag power or the rotating force of a spool, for example, during flying and casting the line.

Due to the above drag power controller, the rotating force of the spool is controlled to let the fishhook, along with the float, fly and be thrown to a desired point and to prevent possible backlash caused by over-rotation of the spool. The drag power controller also varies the resistance to the line release when the spool is rotated during the playing of the hooked fish.

It is well known in the prior art that right-handed fishermen differ from left-handed fishermen in the rotating directions of their spools applied with the drag power.

That is, the spool rotating direction for flying and casting the line in the case of a right-handed fisherman is same with the spool rotating direction for retrieving the line in the case of a left-handed fisherman. In this regard, the rotating direction of the drag power controller in cooperation with the spool must be reversed when the fly reel for a right-handed fisherman is used by a left-handed fisherman.

In order to achieve the above object, several types of fly reel drag direction changers have been proposed and used. A representative example of the typical drag direction changers is shown in FIGS. 6A to 6C.

FIG. 6A is a exploded perspective view of a fly reel with the typical drag direction changer. As shown in the drawing, the fly reel 50 has a spool 16 which is mounted to the shaft 13 of a reel frame 11 such that the spool 16 is rotatable relative to the frame 11. The drag direction changer 56 is fitted over the frame shaft 13.

The drag direction changer 56 gears into the drag power controller 54 and engages with a drag sound claw 55 and in turn cooperates with the spool 16. The controller 54 and the claw 55 are mounted on the frame 11 at opposite sides of the changer 56 respectively.

As best seen in FIG. 6B, the drag direction changer 56 includes a rotating wheel 59 and a drag gear 57. The drag gear 57 is fitted over the wheel 59 such that they are independently rotatable. The wheel 59 is provided with a ratchet 60 on its inner surface facing to the drag gear 57, while the drag gear 57 is provided with a stopper 58 formed of a rolled spring steel plate. The stopper 58 is mounted to the gear 57 by means of a pin 58a(see FIG. 6C) and biased by its own spring force so as to elastically engage with the ratchet 60 of the wheel 59 and to let the ratchet 60 unidirectionally rotate the drag gear 57. That is, rotation of the spool 16 is accompanied with rotation of the wheel 59. The wheel 59 in turn rotates the drag gear 57 unidirectionally. The drag gear 57, which is rotated along with the spool 16, is applied with controlled rotation restricting force of the drag power controller 54.

In order to cause the drag power in spool rotation in the above case, the drag gear 57 must be rotated by the rotational force of the wheel 59. This is achieved by letting the ratchet 60 of the wheel 59 be engaged with the stopper 58 of the gear 57 and by making the rotational force of the wheel 59 be transmitted to the drag gear 57. In FIG. 6C, when the ratchet 60 is rotated counterclockwise, the ratchet 60 will be engaged with the stopper 58 so that the drag gear 57 will be rotated by the rotational force of the wheel 59. However, when the ratchet 60 is rotated clockwise in FIG. 6C, the stopper 58 can not be engaged with the ratchet 60 so that the rotational force of the wheel 59 can not be transmitted to the drag gear 57 and can not rotate the gear 57.

Otherwise stated, opposite directional rotation of the spool 16 is accompanied with opposite directional rotation of the wheel 59. When the spool 16 is rotated in a direction such that the rotating ratchet 60 is stopped by the stopper 58, the rotation of the spool 16 causes rotation of the drag gear 57. In this case, the drag power by the drag power controller 54 acts on rotation of the spool 16. However, when the spool 16 is rotated in the other direction such that the stopper 58 can not stop the ratchet 60, the rotation of the spool 16 can not cause rotation of the drag gear 57. In this case, the spool 16 along with the wheel 59 is rotated alone and the drag power does not act on rotation of the spool 16.

When the drag gear 57 is rotated by the rotational force of the wheel 59, the drag sound claw 55 gearing into the drag gear 57 generates a drag sound informing the fisherman of the line dragging motion. In addition, the rotated drag gear 57 has the rotational force controlled by the drag power controller 54.

When the above drag direction changer 56 is inversely fitted over the frame shaft 13, the fly reel achieves a motion similar to the above-described motion. However, the rotating direction of the wheel 59 in this case will be reversed. Therefore, the above drag direction changer 56 can change the line dragging direction of the fly reel in accordance with right-handed fishermen and left-handed the drag direction with ease, causes no disturbance in spool rotation for retrieving the line and causes no clicking sound except for the drag sound.

In order to accomplish the above object, the present invention provides a fly reel having a spool rotatably fitted over a frame shaft, a drag disc selectively rotating only when the spool is rotated in a given direction, a drag power controller restricting the rotation of said drag disc to restrict the rotation of the spool in the given direction, and a drag direction changer rotatably fitted over the frame shaft between the drag disc and the spool, rotating the drag disc only when the spool is rotated in the given direction and changing the rotational direction of the drag disc or the drag direction in accordance with a right-handed fisherman and a left-handed fisherman by being fitted over the frame shaft either in a normally fitted position or in a inversely fitted position, wherein said drag direction changer comprises: a ratchet member having a ratchet gear part formed on the circumference of the ratchet member, a circular silent cam slot formed on the circumference of the ratchet member, and a first coupling means for coupling the ratchet member to the spool and making the ratchet member rotated along with the spool in opposite directions; a silent cam elastically received in said silent cam slot such that said silent cam is rotated along with the ratchet member due to elasticity but simply slides in the silent cam slot when the elasticity is fishermen.

That is, the line dragging direction of the fly reel can be easily reversed by simply fitting the drag direction changer 56 and agreeable to fishermen regardless of their being right-handed or left-handed.

However, the above drag direction changer has a problem in that as the stopper 58 made of a spring steel plate comes into elastic contact with the ratchet 60 to transmit the rotational force of the ratchet 60 in one direction only, the stopper 58 generates a clicking sound when the spool 16 is rotated in a direction such that it, without generating the drag power, retrieves the line. The clicking sound generated by the stopper 58 is not distinguished from the drag sound of the claw 55 and makes the drag motion be indistinct.

Also, it is preferred to make no disturbance in the rotation of the spool in order to retrieve the line with small force. However, the wheel is always applied with the biasing force of the elastic stopper and, as a result, causes a disturbance in the rotation of the spool for retrieving the line.

SUMMARY OF THE INVENTION

It is, therefore, an object of the present invention to provide a fly reel drag direction changer in which the above problems can be overcome and which reliably changes overcome, said silent cam having an arm radially extending to the outside of the ratchet member; a stopper having a recess for receiving the arm of the silent cam such that the stopper is rotated between a ratchet engaging position and a ratchet releasing position in accordance with the rotating direction of the ratchet member; and a rotatable coupling wheel on which said stopper is mounted rotatably between the ratchet engaging position and the ratchet releasing position such that the rotatable coupling wheel is selectively rotated along with the ratchet member in the ratchet engaging position only, said rotatable coupling wheel having a second coupling means for coupling the rotatable coupling wheel to the drag disc such that the rotatable coupling wheel is rotated with the drag disc in both the normally fitted position and the inversely fitted position.

The silent cam may have a circular section, said silent cam slot may be circumferentially formed on the center of the ratchet gear part of said ratchet member and said recess of the stopper may extend from the top surface to the bottom surface of the stopper.

The rotatable coupling wheel is preferably a cylindrical housing opening to the top and comprising a bottom plate with a center opening and a side wall.

In one embodiment, the first coupling means of the ratchet member comprises: at least one coupling hole formed on a bottom surface of the spool facing to the drag disc; top and bottom cover plates, each cover plate having at least one coupling projection which is engaged with the coupling hole of the spool so as to transmit the rotational power of the spool, and a hollow rotating shaft rotatably fitted between the frame shaft and the center opening of the rotatable coupling wheel and adapted for coupling the ratchet member and the top and bottom cover plates to each other in their center coupling holes such that the top cover plate and the ratchet member are disposed on the inner side of the bottom plate of the rotatable coupling wheel and the bottom cover plate is disposed on the outer side of the bottom plate of the rotatable coupling wheel and the ratchet member and the top and bottom cover plates are rotated relative to the rotatable coupling wheel. The second coupling means of the rotatable coupling wheel comprises: at least one coupling hole formed on said drag disc; and at least one coupling projection formed on the top and bottom edges of the side wall of said rotatable coupling wheel such that the coupling projection is engaged with the coupling hole of the drag disc so as to rotate the drag disc.

In the other embodiment, the hollow rotating shaft and said bottom cover plate are formed into a single body, said ratchet member and said top cover plate are formed into a single body, and said hollow rotating shaft and the center coupling holes of said ratchet member and said top and bottom cover plates have a polygonal shape.

BRIEF DESCRIPTION OF THE DRAWINGS

The above and other objects, features and other advantages of the present invention will be more clearly understood/from the following detailed description taken in conjunction with the accompanying drawings, in which:

FIG. 1 is a schematic exploded perspective view of a fly reel with a drag direction changer in accordance with a primary embodiment of the present invention;

FIG. 2 is a detailed exploded perspective view of the drag direction changer of FIG. 1;

FIG. 3 is a partially sectioned half front view of the fly reel of the invention, showing the construction of the assembled changer of FIGS. 1 and 2;

FIGS. 4A and 4B are plan views of the drag direction changer of FIGS. 1 and 2, showing the operation of the changer;

FIGS. 6A to 6C are views showing a typical drag direction changer, in which:

FIG. 6A is an exploded perspective view of a fly reel with the drag direction changer;

FIG. 6B is a sectional view of the drag direction changer of FIG. 6A; and

FIG. 6C is a schematic plan view of the drag direction changer taken along the line A—A of FIG. 6B, showing the operation of the changer.

DESCRIPTION OF THE PREFERRED EMBODIMENTS

Figure 5:
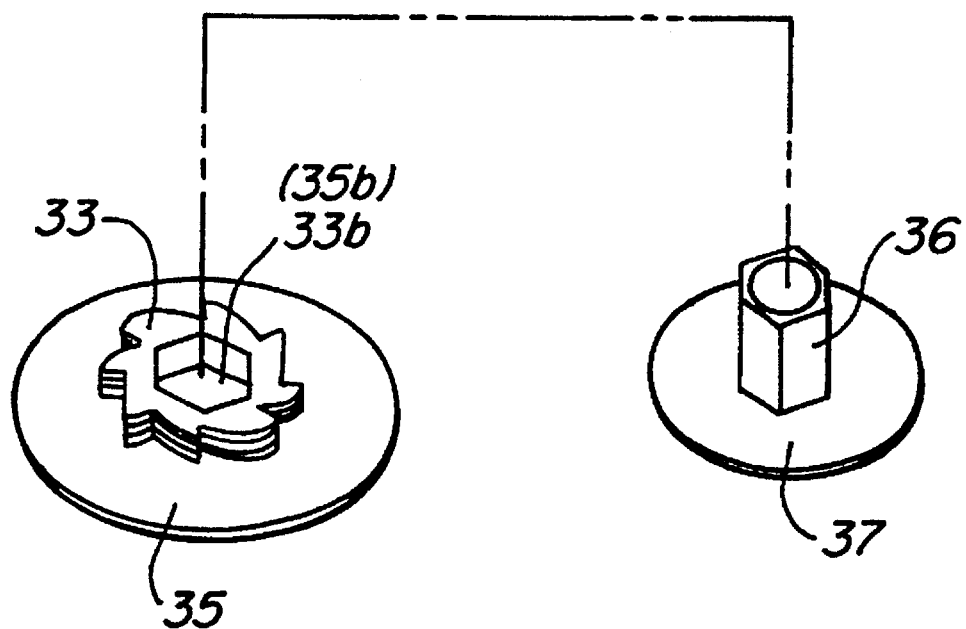
FIG. 5 is an exploded perspective view of a drag direction changer in accordance with another embodiment of the prevent invention.
Figure 6B:
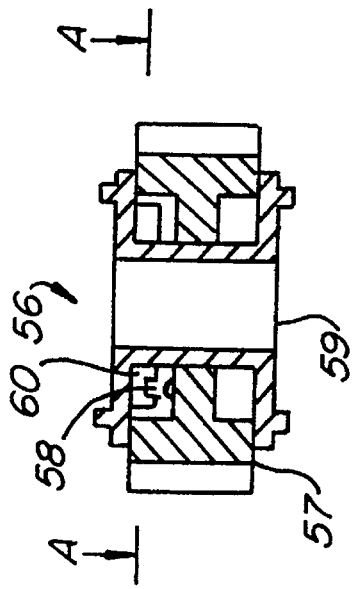
Figure 6C:
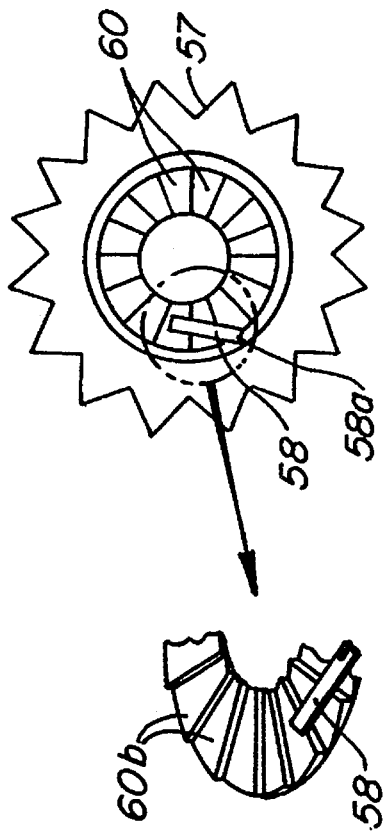
Figure 6A:
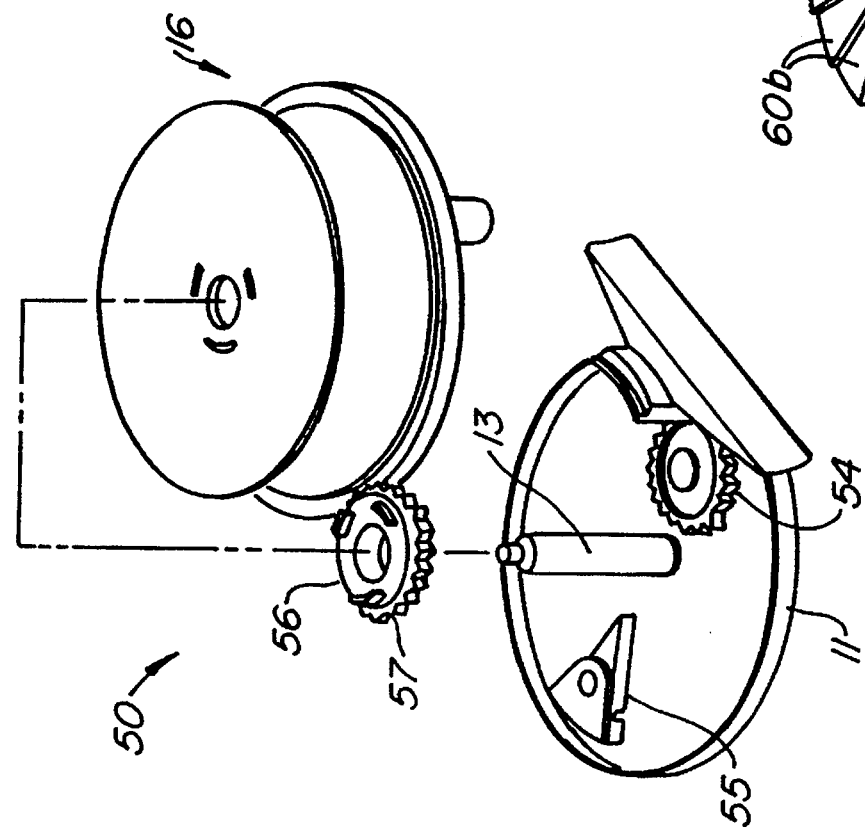

FIG. 1 is an exploded perspective view of a fly reel with a drag direction changer in accordance with a primary embodiment of the present invention. FIG. 2 is a detailed exploded perspective view of the drag direction changer of FIG. 1. FIG. 3 is a partially sectioned half front view of the fly reel of the invention, showing the construction of the drag direction changer.

As shown in FIGS. 1 to 3, the fly reel 10 with the drag direction changer of this invention includes a frame 11 and a spool 16. The spool 16 is mounted to the frame 11 such that the spool 16 is rotatable relative to the frame 11.

The frame 11 includes a base 12 for fixing the fly reel 10 to a fishing rod clamp. The frame 11 also includes a shaft 13 for rotatably fitting the spool 16 to the frame 11. A drag disc 15 engaging with a drag power controller 14 is fitted over the shaft 13 and rotatably mounted on the frame 11. The drag direction changer 30 is fitted over the shaft 13 such that the drag direction changer 30 is coupled to the drag disc 15 so as to rotate the drag disc 15. A spool rotating sound and drag sound generator 19 is mounted to the frame 11 close to the drag disc 15 as shown in FIG. 3, and the bottom surface of the spool 16 has a spool rotating sound generating gear 18, a drag direction changer mounting recess 20 and coupling holes 21 (see FIG. 1).

The drag direction changer 30 includes a rotatable coupling wheel 31 which is coupled to the drag disc 15. A stopper 32 is mounted on the rotatable coupling wheel 31 rotatably between a ratchet engaging position(shown in a solid line in FIG.4) and a ratchet releasing position (shown in a dot-dashed line in FIG.4). Said rotatable coupling wheel 31 is a cylindrical housing opening to the top and comprising a bottom plate with a center opening 31*d* and a side wall which is provided on the top and bottom edges with projections 31*a* and 31*b* for engaging with coupling holes 15*a* of the drag disc 15. The projections 31*a* and 31*b* may be formed at diametrically opposed portions.

The drag direction changer 30 also includes a ratchet member 33 having a ratchet gear part which is designed to be engaged with the stopper 32 in one rotational direction only or in the ratchet engaging position only.

The ratchet member 33 is provided with a silent cam slot 33*a* for mounting the silent cam 34 elastically. The center of the ratchet member 33 is holed to form a center coupling hole 33*b*.

The silent cam 34 has an elasticity and a circular section, which is kept in the silent cam slot 33*a* of the ratchet member 33. A silent cam 34 is elastically set in the silent cam slot 33*a* of the ratchet member 33 to rotate the stopper 32 and has an arm 34*a* which is projected to the outside of the ratchet member 33.

In the drag direction changer 30, the ratchet member 33 is interposed between a top cover plate 35 and the rotatable coupling wheel 31. The top cover plate 35 comes into contact with the bottom flange of the spool 16 in the upper surface when both the drag direction changer 30 and the spool 16 are fitted over the shaft 13. A bottom cover plate 37 is disposed beneath the rotatable coupling wheel 31. The outer surfaces of the top and bottom cover plates 35 and 37 are provided with coupling projections 35*a* and 37*a* which are engaged with the coupling holes 21 of the spool 16, and center coupling holes 35*b* and 37*b* in the center.

The drag direction changer 30 further includes a hollow rotating shaft 36 which is fitted into the center coupling hole 33*b* of the ratchet member 33 and into the center coupling holes 35*b* and 37*b* of the top and bottom cover plates 35 and 37 passing through the center opening 31*d* of the rotatable coupling wheel 31 such that the ratchet member 33 and the plates 35 and 37 are rotatable together relative to the rotatable coupling wheel 31. It is preferred to make the hollow rotating shaft 36 and the center coupling holes 33*b*, 35*b* and 37*b* have a polygonal shape suitable for integral rotation of the ratchet member 33 and the cover plates 35 and 37.

The rotatable coupling wheel 31 also has a stopper shaft 31*c* for fitting the stopper 32 thereon. The stopper 32 has a shaft hole 32*a* for fitting the stopper 32 over the stopper shaft 31*c*.

In order to engage with the silent cam 34, the stopper 32 is also provided with a recess 32*b* which is designed to receive the arm 34*a* of the silent cam 34. The stopper 32 also has a claw part 32*c* engaged with the ratchet gear part of the ratchet member 33 in one rotational direction only.

As shown in FIG. 5 showing another embodiment of the drag direction changer of the invention, the top cover plate 35 may be integrated with the ratchet member 33 into a single body. In the same manner, the bottom cover plate 37 may be integrated with the hollow rotating shaft 36 into a single body. The single bodies facilitate assembling or inversing of the drag direction changer and reliably achieve the integral rotation of the ratchet member 33 and the cover plates 35 and 37.

The operational effect of the above drag direction changer 30 and the fly reel 10 having the changer 30 will be described hereinbelow.

When the spool 16 is rotated to cause the drag power as shown in FIGS. 3 and 4A, the cover plates 35 and 37 and the ratchet member 33, which are integrated with each other, are rotated relative to the rotatable coupling wheel 31.

This is caused by the fact that the coupling projections 35*a* of the top cover plate 35 engage with the coupling holes 21 of the spool 16.

In accordance with the rotation of the ratchet member 33, the silent cam 34 which is elastically kept in the silent cam slot 33*a* of the ratchet member 33 is rotated so that the arm 34*a* of the cam 34 rotates the stopper 32. The claw part 32*c* of the stopper 32 thus engages with the ratchet member 33.

The rotating force of the ratchet member 33 is, therefore, transmitted to the rotatable coupling wheel 31 through the stopper 32 and rotates the rotatable coupling wheel 31 in the same direction.

The rotating force is transmitted to the drag disc 15 through the engagement of the coupling holes 15*a* with the coupling projections 31*b* and controlled by the drag power controller 14, thereby causing the controlled drag power.

At this time, the drag sound generating claw of the spool rotating sound and drag sound generator 19 comes into strike with the projections formed on the bottom of the drag disc 15 to generate the clicking sound or the drag sound.

When the spool 16 is rotated to retrieve the line without causing any drag power, the ratchet member 33 rotates in a reverse direction so that the arm 34*a* of the silent cam 34 rotates the stopper 32 and places the stopper in the position 32X of FIG. 4A (32Y in FIG. 4B). Therefore, the rotatable coupling wheel 31 is separated from the ratchet member 33.

The drag power is thus not transmitted to the spool 16 so that the fisherman can easily retrieve the line by simply rotating the spool 16 with small force.

That is, due to the rotation of the spool 16 the top cover plate 35 which is coupled to the coupling holes 21 of the spool 16 rotates and at the same time the ratchet member 33 and the bottom cover plate 37 except for the rotatable coupling wheel 31 rotate.

At this time, the spool rotating sound generating claw of the spool rotating sound generator 19 may come into contact with the spool rotating sound generating gear 18 of the spool 16 formed on the bottom of the drag disc 15 to generate the spool rotating sound.

In this case, the silent cam 34, which has levered the stopper 32, is stopped and simply slides in the silent cam slot 33*a* of the rotating ratchet member 33.

Therefore, the fly reel of this invention generates no noise due to both the silent cam 34 and the stopper 32. The fly reel may generate a clear spool rotating sound and a clear drag sound. The spool rotating sound of this fly reel is clearly distinguishable from the drag sound.

When the spool rotating sound generating claw of the sound generator is separate from the spool rotating sound generating gear 18 of the spool 16, the fly reel does not generate any sound during retrieving.

To change the drag direction in accordance with a right-handed fisherman and a left-handed fisherman, the drag direction changer 30 is overturned and fitted over the shaft 13.

In this case, the projections 31a of the rotatable coupling wheel 31 engage with the coupling holes of the drag disc 15, while the projections 37a of the bottom cover plate 37 engage with the coupling holes 21 of the spool 16.

When the drag direction changer 30 is overturned and fitted over the shaft 13 as described above, the direction of the ratchet member 33 is reversed as shown in FIG. 4B. In this case, the spool rotates in the reversed direction to achieve the spool rotation causing the drag power.

If the position of the drag direction changer which makes the normal rotation of the spool cause the drag power as shown in FIG. 4A is for a right-handed fisherman, the position of the changer which makes the reverse rotation of the spool cause the drag power as shown in FIG. 4B is for a left-handed fisherman.

The operation of the drag direction changer shown in FIG. 4B and the fly reel having the changer is same with that of FIG. 4A.

In the embodiment of FIG. 5, the top cover plate 35 is integrated with the ratchet member 33 into a single body. In the same manner, the bottom cover plate 37 is integrated with the hollow rotating shaft 36 into a single body. The single bodies of this embodiment facilitate production, assembling and overturning of the drag direction changer 30 and reliably achieve the integral rotation of the ratchet member 33 and the cover plates 35 and 37. The assembling of the two single bodies is simply achieved by caulking of the hollow shaft 36 at the top cover plate 35.

As described above, the drag direction changer of the invention has a silent cam which operates the stopper rotatable exclusively in the direction causing the drag power. The silent cam lets no noise be generated between the stopper and the ratchet member and removes any spool rotation disturbance which could be possibly generated between the stopper and the ratchet member. The drag direction changer of the invention generates a clear drag sound and a clear spool rotating sound which are distinguishable from each other. Another advantage of the drag direction changer is resided in that the fly reel drag direction can be precisely changed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the top and bottom surfaces of the ratchet member may be provided with top and bottom coupling projections and coupled to the rotatable coupling wheel such that the bottom surface of the ratchet member projects out of the bottom plate of the rotatable coupling wheel and the ratchet member is rotatable relative to the rotatable coupling wheel.

What is claimed is:

1. A fly reel having a spool rotatably fitted over a frame shaft, a drag disc selectively rotating only when the spool is rotated in a given direction, a drag power controller restricting the rotation of said drag disc to restrict the rotation of the spool in the given direction, and a drag direction changer rotatably fitted over the frame shaft between the drag disc and the spool, rotating the drag disc only when the spool is rotated in the given direction and changing the rotational direction of the drag disc in accordance with a right-handed fisherman and left-handed fisherman by being fitted over the frame shaft in both a normally fitted position and an inversely fitted position, wherein said drag direction changer comprises:

a ratchet member having a ratchet gear part formed on the circumference of the ratchet member, a circular silent cam slot formed on the circumference of the ratchet member, and a first coupling means for coupling the ratchet member to the spool and enabling the ratchet member to be rotated along with the spool in opposite directions;

a silent cam frictionally received in said silent cam slot such that said silent cam is rotated along with the ratchet member due to friction but simply slides in the silent cam slot when the friction is overcome, said silent cam having an arm radially extending toward the circumference of the ratchet member;

a stopper having a recess for receiving the arm of the silent cam such that the stopper is rotated between a ratchet engaging position and a ratchet releasing position in accordance with the rotating direction of the ratchet member; and a rotatable coupling wheel on which said stopper is mounted rotatably between the ratchet engaging position and the ratchet releasing position such that the rotatable coupling wheel is selectively rotated along with the ratchet member in the ratchet engaging position only, said rotatable coupling wheel having a second coupling means for coupling the rotatable coupling wheel to the drag disc such that the rotatable coupling wheel is rotated with the drag disc in both the normally fitted position and the inversely fitted position, said rotatable coupling wheel comprising a cylindrical housing having an open top and including a bottom plate with an inner side, an outer side, a center opening and a side wall having top and bottom edges;

said first coupling means of the ratchet member further comprising:

at least one coupling hole formed on a bottom surface of the spool facing the drag disc;

top and bottom cover plates, each cover plate having at least one coupling projection which is engageable with the coupling hole of the spool, and a center coupling hole; and a hollow rotating shaft rotatably fitted between the frame shaft and the center opening of the rotatable coupling wheel and adapted for coupling the ratchet member and the top and bottom cover plates to each other in their center coupling holes such that the top cover plate and the ratchet member are disposed on the inner side of the bottom plate of the rotatable coupling wheel and the bottom cover plate is disposed on the outer side of the bottom plate of the rotatable coupling wheel and the ratchet member and the top and bottom cover plates are rotatable relative to the rotatable coupling wheel; and said second coupling means of the rotatable coupling wheel further comprising:

at least one coupling hole formed on said drag disc; and at least one coupling projection formed on the top and bottom edges of the side wall of said rotatable coupling wheel such that said at least one of the coupling projections is engaged with said at least one of the coupling holes of the drag disc so as to rotate the drag disc.

2. The fly reel according to claim 1, wherein said silent cam has a circular section and said recess of the stopper extends from the top surface to the bottom surface of the stopper.

3. The fly reel according to claim 1, wherein said hollow rotating shaft and said bottom cover plate are formed into a single body, said ratchet member and said top cover plate are formed into a single body, and said hollow rotating shaft and the center coupling holes of said ratchet member and said top and bottom cover plates have a polygonal shape.

* * * * *